(12) United States Patent
Kline et al.

(10) Patent No.: US 10,953,280 B2
(45) Date of Patent: Mar. 23, 2021

(54) OBSERVATION-BASED BREAK PREDICTION FOR SPORTING EVENTS

(71) Applicant: International Business Machine Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 16/202,252

(22) Filed: Nov. 28, 2018

(65) Prior Publication Data

US 2020/0164247 A1    May 28, 2020

(51) Int. Cl.
*A63B 24/00*     (2006.01)
*A63B 71/06*     (2006.01)
*G06F 3/01*      (2006.01)

(52) U.S. Cl.
CPC .......... *A63B 24/0062* (2013.01); *A63B 71/06* (2013.01); *A63B 2220/05* (2013.01); *G06F 3/015* (2013.01)

(58) Field of Classification Search
CPC ................ G06F 3/015; A63B 2220/00; A63B 2220/05; A63B 2230/00–75
See application file for complete search history.

(56) References Cited

U.S. PATENT DOCUMENTS 9,731,166 B2 * 8/2017 Zhang ................. A63B 24/0062
10,275,026 B2 * 4/2019 Bostick .................. G06F 3/015
(Continued)

FOREIGN PATENT DOCUMENTS

CN    104200076 A    12/2014
WO    2004003815 A1   1/2004

OTHER PUBLICATIONS

Forbes, [online]; [retrieved on Nov. 27, 2018]; retrieved from the Internet https://www.forbes.com/sites/leebelltech/2017/03/24/future-tennis-could-relay-live-biometric-data-of-players-during-gameplay/#42ebl6c24cca.BELL, "Future Tennis Could Relay Live Biometric Data of Players During Gameplay,", Mar. 24, 2017, 3p.

(Continued)

*Primary Examiner* — Steven J Hylinski
(74) *Attorney, Agent, or Firm* — Cantor Colburn LLP; Tihon Poltavets

(57) ABSTRACT

Methods, systems and computer program products for providing observation-based recommendations for improved player performance and safety are provided. Aspects include receiving historical player performance data. Historical player performance data includes known correlations between visual characteristics, biometric characteristics and conditions of players of sports. Aspects include receiving current video data. Current video data includes images of a plurality of players that are playing a sport. Aspects include receiving current player biometric data. Current player biometric data includes biometric data of the plurality of players that are playing the sport. Based on the historical player performance data, the current video data and the current biometric data, aspects also include determining a condition of a target player. Aspects also include determining a break recommendation for the target player based on the determined condition.

14 Claims, 6 Drawing Sheets

(56) References Cited

U.S. PATENT DOCUMENTS

| | | | |
|---|---|---|---|
| 2005/0143198 A1* | 6/2005 | Charge | A63B 24/0021 |
| | | | 473/422 |
| 2006/0074338 A1 | 4/2006 | Greenwald et al. | |
| 2006/0205564 A1* | 9/2006 | Peterson | A61B 5/0022 |
| | | | 482/8 |
| 2007/0219059 A1* | 9/2007 | Schwartz | A61B 5/0205 |
| | | | 482/8 |
| 2011/0009193 A1* | 1/2011 | Bond | A63F 13/42 |
| | | | 463/36 |
| 2014/0096152 A1 | 4/2014 | Ferens et al. | |
| 2015/0056589 A1* | 2/2015 | Zhang | G09B 19/003 |
| | | | 434/236 |
| 2015/0087478 A1* | 3/2015 | Zhang | A63B 24/0003 |
| | | | 482/8 |
| 2015/0352406 A1 | 12/2015 | Burich et al. | |
| 2016/0107029 A1* | 4/2016 | Kim | A61B 5/6895 |
| | | | 482/8 |
| 2016/0133152 A1* | 5/2016 | Arif | A61B 5/11 |
| | | | 434/247 |
| 2018/0117417 A1* | 5/2018 | Davis | A63B 24/0075 |
| 2019/0054347 A1* | 2/2019 | Saigh | A61B 5/02055 |
| 2020/0023237 A1* | 1/2020 | Yamada | A61B 5/681 |

OTHER PUBLICATIONS

Wikipedia, [online]; [retrieved on Nov. 27, 2018]; retrieved from the Internet https://en.wikipedia.org/wiki/Half-time. "Half-time", 3p.

\* cited by examiner

OBSERVATION-BASED BREAK PREDICTION FOR SPORTING EVENTS

BACKGROUND

The present invention generally relates to increasing player performance and safety of during sporting events, and more specifically, to generating recommendations for player breaks based on correlated video and biometric-based observations of players.

In many sports, there are predefined breaks in the game that allow players to catch their breath, rehydrate, stretch muscles and generally achieve some degree of physical rest and recovery before reentering the game. In some sports, breaks may also be initiated by coaches and players through selective use of a finite number of "time outs" that may pause the game to allow players to take a break. Alternatively, in some sports, individual players may be given a break by substituting the player out for another player. Although such predetermined and selectively applied breaks are designed to give one or more players rest, they do not provide a tailored solution for individual players to help players avoid injuries and maximize performance.

SUMMARY

Embodiments of the present invention are directed to a computer-implemented method for providing observation-based recommendations for improved player performance and safety. A non-limiting example of the computer-implemented method includes receiving historical player performance data. The historical player performance data includes known correlations between visual characteristics, biometric characteristics and conditions of players of sports. The method also includes receiving current video data. Current video data includes images of a plurality of players that are playing a sport. The method also includes receiving current player biometric data. Current player biometric data includes biometric data of the plurality of players that are playing the sport. Based on the historical player performance data, the current video data and the current biometric data, the method includes determining a condition of a target player. The target player is a player of the plurality of players that are playing the sport. The method also includes determining a break recommendation for the target player based on the determined condition.

Embodiments of the present invention are directed to a system for providing observation-based recommendations for improved player performance and safety. The system includes a memory having computer readable computer instructions, and a processor for executing the computer readable instructions. The computer readable instructions include instructions for receiving historical player performance data. The historical player performance data includes known correlations between visual characteristics, biometric characteristics and conditions of players of sports. The computer readable instructions also include instructions for receiving current video data. Current video data includes images of a plurality of players that are playing a sport. The computer readable instructions also include instructions for receiving current player biometric data. Current player biometric data includes biometric data of the plurality of players that are playing the sport. Based on the historical player performance data, the current video data and the current biometric data, the computer readable instructions include instructions for determining a condition of a target player. The target player is a player of the plurality of players that are playing the sport. The computer readable instructions also include instructions for determining a break recommendation for the target player based on the determined condition.

Embodiments of the invention are directed to a computer program product for providing observation-based recommendations for improved player performance and safety, the computer program product comprising a computer readable storage medium having program instructions embodied therewith. The computer readable storage medium is not a transitory signal per se. The program instructions are executable by a processor to cause the processor to perform a method. A non-limiting example of the method includes receiving historical player performance data. The historical player performance data includes known correlations between visual characteristics, biometric characteristics and conditions of players of sports. The method also includes receiving current video data. Current video data includes images of a plurality of players that are playing a sport. The method also includes receiving current player biometric data. Current player biometric data includes biometric data of the plurality of players that are playing the sport. Based on the historical player performance data, the current video data and the current biometric data, the method includes determining a condition of a target player. The target player is a player of the plurality of players that are playing the sport. The method also includes determining a break recommendation for the target player based on the determined condition.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
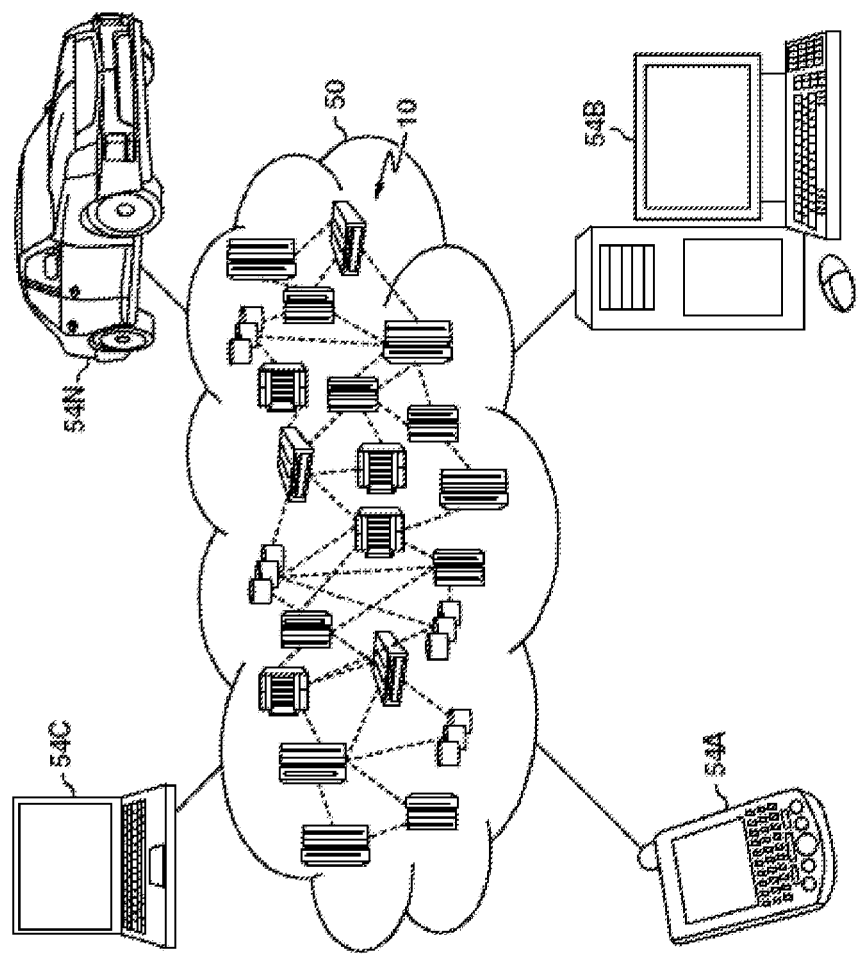
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
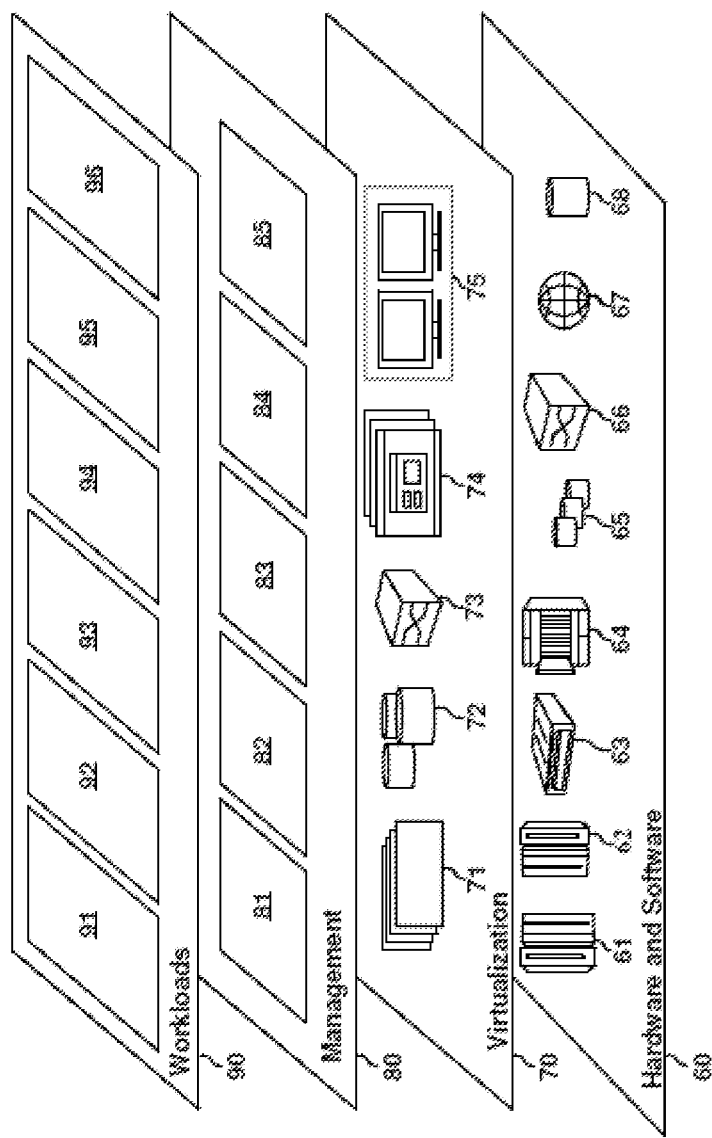
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing observation-based recommendations for improved player performance and safety 96.

Figure 3:
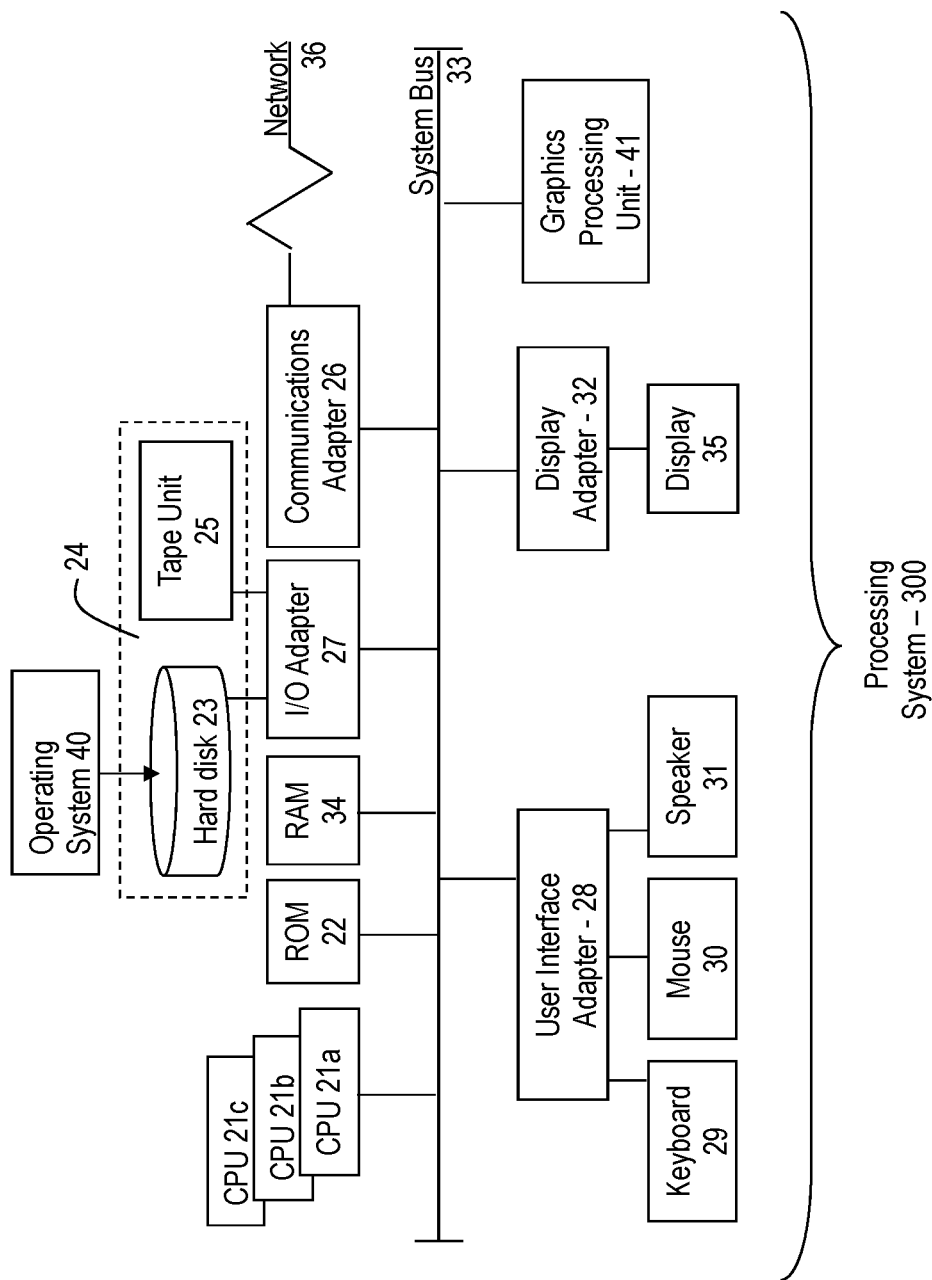
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for providing observation-based recommendations for a player safety-based commercial break is provided. In exemplary embodiments, the system can be used to determine the level of a player's stress, tiredness, health and performance in order to make a recommendation for giving the player a break, by for example, removing the player from the game, substituting the player out of the game temporarily, or for calling a "time out" to give one or more players time to rest. The system may correlate a visual analysis (and if applicable, audio analysis) of a player's actions (e.g., running slow, stumbling, limping, wobbling, getting up slowly, slurring speech, etc.) with biometric readings taken from the player to assess the health and performance condition of the player. Such assessments can also be based on historical data of known correlations between biometric data and observed behavior to create predictions of current and future player conditions. Based on these predictions, the system may generate a recommendation for when and for how long to give a player a break. Recommendations can be presented to a coach (e.g., via a mobile device), a referee, or to the player directly (e.g., via a heads-up display of a helmet). Further, in some embodiments, an indication of a player's predicted condition may be visually represented on the player themselves, by for example, displaying a coded light on the helmet of a player (e.g., green means healthy, yellow means tired, red means in danger) or the like. In some embodiments, recommendations can be automatically executed by for example, communicating with a game server to initiate an automatic substitution of a player or call a time-out. Some embodiments of the present disclosure may also be used to assess the overall performance of all players of a sport to determine the best time to take a commercial break in order to attempt to maximize overall player safety and competitiveness.

Figure 4:
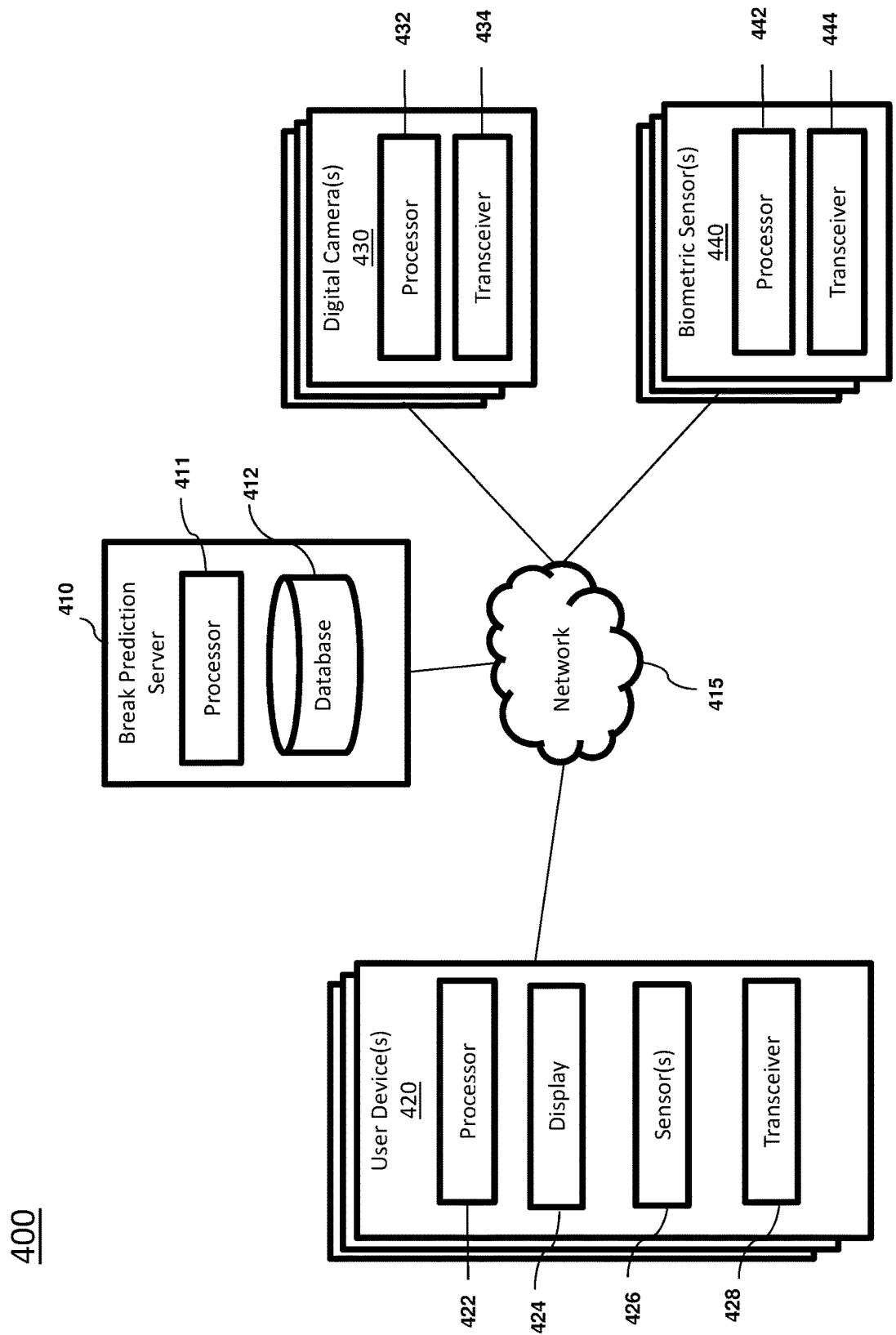
FIG. 4 depicts a system upon which providing observation-based recommendations for improved player performance and safety may be implemented according to one or more embodiments of the present invention.

Turning now to FIG. 4, a system 400 for providing observation-based recommendations for improved player performance and safety will now be described in accordance with an embodiment. The system 400 includes a break prediction server 410 in communication with user devices 420, digital camera(s) 430 and biometric sensor(s) 440 via communications network 415. The communications network 415 may be one or more of, or a combination of, public (e.g., Internet), private (e.g., local area network, wide area network, virtual private network), and may include wireless and wireline transmission systems (e.g., satellite, cellular network, Wi-Fi, terrestrial networks, etc.). The break prediction server 410 is configured to assess a condition of one or more players of a sport and make a recommendation(s) for player breaks as described in greater detail below.

In exemplary embodiments, break prediction server 410 can include a processor 411 for processing data and performing the functionalities described herein, and a transceiver 412 for communicating with user device(s) 420, digital camera(s) 430 and biometric sensor(s) 440. The break prediction server 410 is configured to receive biometric data associated with one or more players of a sport from biometric sensor(s) 440. The break predication server 410 is also configured to receive video data (e.g., images, videos, and/or recorded sound) from a digital camera(s) 430. The video data can include videos, images and/or sounds of one or more players playing a sport (which can include video of the players resting on the sidelines as well as actively participating in the game). According to some embodiments, break prediction server 410 can be configured to identify and track each player in the video using image recognition techniques. For example, break prediction server 410 may be configured to recognize the face of each player and/or the name or number on each player's jersey to identify the player. According to some embodiments, the biometric data received from the biometric sensor(s) 440 may include metadata that is sufficient to identify the player that is associated with the respective biometric data. Thus, the break prediction server 410 can receive video of a sport or game being played, and may correlate the biometric data of each player with the recorded physical actions of each player in near real-time. For example, if a particular player suddenly begins to run faster, the break prediction server 410 may be configured to determine the player's speed (e.g., either based on performing an analysis on the video feed or from a biometric sensor 440 on the player that tracks acceleration and/or speed) and monitor any correlated increase in the player's breathing, heart rate or other biometric signals.

The break prediction server 410 can be configured to identify one or more conditions of a player based on an analysis of the video of a player in conjunction with the biometric data of the player. The determination of player conditions may be further based on historical player performance data that includes known correlations between visual characteristics, biometric characteristics, and conditions of players of one or more sports. For example, based on historical player performance data, the break prediction server 410 may know that in general, a player has a certain probability of obtaining a certain condition (e.g., pulling a muscle) based on various metrics observed about the player (e.g., how long the player has been running for, the rate of acceleration in running used by the player, the degree of player dehydration, etc.) as well as various visual classifications relating to the players. According to some embodiments, visual classifications may be determined by the break prediction server 410 by performing a visual analysis of the video(s) of a player and identifying mistakes or diminished player characteristics, such as for example but not limited to, diminished abilities relating to achieving balance, depth perception, ball control, anticipation of player/ball movements, accuracy in shooting/passing a ball, speed, reaction time and the like, as well as visual indicia of decreased performance such as perspiration, heart rate, breathing rate, pupil dilation, limping, and loss of strength, focus or stamina. For example, in baseball, the system may track the pitches being called (i.e., a type of pitch that is chosen to be thrown) by the pitcher, catcher or coach against the accuracy of the pitches being thrown. Likewise, in soccer, the system may track the contact made with the ball when a player kicks the ball to determine if the ball is being kicked where the player intended it to go. Other examples may include failure to catch a ball, failure to make a tackle, failure to pass a ball, failure to see a play, misreading a play or any other such failure relating to a sport or game that may be determined via visual analysis. According to some embodiments, such known correlations can be determined by applying machine learning techniques to past data and continuing to refine the machine learning models with current data. As will be appreciated by those of skill in the art, different machine learning models may be trained for each sport or game. In some embodiments, different machine learning models can be trained and used with respect to each position in a sport (e.g., different models for a quarterback, a running back, a receiver, etc.) or with respect to individual players (e.g., a player may have an established baseline performance and the player's current season/game performance can be compared against the baseline). Further, in some embodiments, the break prediction server 410 may incorporate environmental data, such as the weather, the altitude, the barometric pressure and the like, as these environmental aspects may impact the health and performance of players.

According to some embodiments, the break prediction server 410 can compare the current biometric data and visual data relating to a player against the historical player performance data to determine one or more current conditions of a player and/or predict one or more future conditions of the player. For example, the break prediction server 410 could determine that a player is tired such that their performance is suffering or that a player is very likely to be tired such that their performance will begin to suffer in, for example, 4 minutes. It should be understood that although conditions such as "being tired" may be referred to herein generally, that the break prediction server 410 may process and express conditions in more definite mathematical representations. In other words, the system may determine that over some previously specified time window (e.g., the last three minutes) a player is running at 80% of their typical average speed, which may be compared to a predetermined threshold (e.g., 90%) to determine that the player is classified as "being tired." Further, such classifications may also be based on a comparison to other players to isolate out individual behavior. For example, if all players have shown a 15-20% increase in speed in the last three minutes, the system may determine that this is not representative of tiredness but rather the influence of some external factor impacting all players (e.g., rain or snow). Further, it should be understood that in some embodiments, conditions may be expressed as probability curves based on a number of factors, and the break prediction server 410 may only designate a player has a condition if the probability exceeds a predetermined threshold. Similarly, the break prediction server may determine a probability curve of a player obtaining a condition in the future, which may be presented as a more simplified prediction to a coach via user device 420. For example, the break prediction server 410 may determine there is a 1% chance of a player becoming injured in the next minute, a 2% chance in the next 2 minutes, a 3% chance in the next three minutes and a 10% chance in the next four minutes, and the system may then generate a recommendation to give the player a break in three minutes to avoid injury. Those of skill in the art will recognize that a plethora of different algorithms, thresholds and data points may be used by the system to determine what the ultimate recommendation will be, based on the goals and risk tolerances of the players and coaches.

According to some embodiments, the break prediction server 410 may also be configured to determine whether a condition or predicted condition is severe or dangerous. For example, if a player visually appears to be moving in a manner that is understood to correlate to having a concussion, arrhythmia or other such condition and is simultaneously showing biometric data that may indicate a concussion, arrhythmia or other such condition, then the system may determine that there is an urgent need to give the player a break. In such cases, break prediction server 410 may be configured to output urgent recommendations to user device(s) 420, or in some cases, may even be configured to automatically initiate a break for the player by, for example, transmitting a request to a game server or user device 420 of a referee to substitute out the player or take a timeout.

According to some embodiments, the break prediction server 410 can be configured to determine one or more of an injury condition, a focus condition, a performance condition and/or a recovery condition of a player. An injury condition can be an indication of a degree to which a player has an injury and/or is likely to become injured, for example, based on a visual observation of whether the player is limping paired with biometric data. A focus condition can be an indication of a degree to which a player is likely to make one or more mistakes due to a lack of focus, based on for example, a visual observation of the player's alertness (e.g., how fast and how often the player moves their head to look around the field) paired with biometric signals. A performance condition can be an indication of a degree to a player is performing relative to a known average performance, based on for example, a visual observation of speed and reaction time of a player as compared to the player's average speed and reaction time. A recovery condition can be an indication of a degree to which a break of a specified duration from playing the sport given to a player would improve one or more of the injury condition, the focus condition or the performance condition of the player that is playing the sport, based on for example, a visual analysis of the effects of temporary rests (e.g., waiting for a "thrown-in" to occur in soccer) on immediately following performance and biometric metrics (e.g., given a 10 second rest, the player began to run 10% faster). One or more of these conditions may be used by the break prediction server 410 to generate a break recommendation for a player. Additionally, according to some embodiments, the break prediction server 410 may also store player-specific historical data and profiles that include historical data for a particular player, as well as information regarding medical conditions or other information of note for a particular player. In some embodiments, the break prediction server 410 may also base a break recommendation on the stored player-specific historical data.

According to some embodiments, a break recommendation generated by the break prediction server 410 can include a recommendation for when to give one or more players a break. For example, a break recommendation may provide a recommendation to give a first player a break in four minutes. According to some embodiments, a break recommendation may include one or more reasons for the recommended break, such as that the player has a certain risk of injury or that the player is performing below their typical performance level by a certain amount. In some embodiments, a break recommendation may include a recommendation for how long to give a player a break or a recommendation to re-enter a player on break back into the game. In some embodiments, a break recommendation may combine recommendations and may include, for example, a recommendation for a substitution of one player with another player that is currently on a break. Thus, in some embodiments, the break prediction server 410 could be used to automate the process of substituting players in and out of a game in order to maximize the safety and performance of the team based on, for example, risk and performance thresholds that are entered by a coach.

Thresholds and baselines may relate to biometric signals (e.g., heartrate, blood pressure, respiration rate, etc.) and/or performance measures (e.g., average running speed, reaction time, missed catches, etc.) and the system may make recommendations based on one or more player's current performance relative to one or more thresholds and/or baselines. According to some embodiments, one or more thresholds for some or all players on a team may be set at the same level. For example, if all players are +/−15% of a nominal target then the system may recommend a break for the entire team. In some embodiments, thresholds may be independently set for each player. In some embodiments, the threshold for one particular player may be dependent or adjusted based on the performance level of another player (e.g., a receiver's threshold for dropping a ball may be adjusted up or down based on a quarterback's current passing performance). In some embodiments, a particular player's threshold for a given variable may be adjusted based on the player's current performance (e.g., if the player is performing exceptionally well and their blood pressure is high, the system may adjust the baseline upwards over time). In cases where a player is performing exceptionally well, but nonetheless has indications of being tired, a coach or player may submit a user input into the system that indicates a desire to override a recommendation for the player to take a break and the system may adjust the baselines/thresholds of the player based on this user input. In some embodiments, the system can identify significant visually based player performance indicators and create a video splice (e.g., 10 seconds before and after a subject event) for analysis by the system or by a user (e.g., a coach). For example, if the system visually determines that a player is not focused, the system may generate a video clip of an event displaying that the player is not focused and may provide the video clip to a user device 420 associated with a coach for viewing. In this manner, the system can automatically provide intermittent feedback, commentary and visual evidence of a player's performance and condition to a coach or other individual.

In exemplary embodiments, user devices 420 can include, but are not limited to, a smartphone, a wearable device such as a smartwatch, an augmented reality headset, a tablet, a computer system such as the one shown in FIG. 3, a smart speaker, a television, or any other suitable electronic device. User device(s) 420 include a processor 422, one or more sensors 424, a display 426 and a transceiver 428. The sensors 424 can include one or more of an image capture device (e.g., digital camera) for obtaining images and/or videos, a microphone for obtaining audio recordings, and a location sensor for obtaining location data of the user device (e.g., GPS coordinates). User devices 420 can include an input device, such as a keyboard (either physical or digital) for receiving user input text. Text can also be input orally via a microphone using voice recognition. In some embodiments, display 426 is configured to display images and/or video. In some embodiments, display 426 can be a touch-screen that may be configured to detect tactile user inputs (e.g., typing, pressing, swiping, etc.). Transceiver 428 can be configured to allow a user device 420 to communicate with other devices via communications network 415 (e.g., via Wi-Fi, cellular communications, etc.).

According to some embodiments, a user device 420 can be a device, such as a smartphone, laptop computer, an augmented reality headset or the like, that may be under the possession or control of a coach, staff member or teammate of a player. The user device 420 can be configured to receive and display break recommendations generated by the break prediction server 410. In some embodiments, the user device 420 can also be configured to display the biometric information and/or video analysis of one or more players, to provide data to support one or more suspected conditions of the players. For example, if the system has determined that a player is only performing at 80% of their average performance rate across various metrics, the user device 420 may display data showing the player's breathing rate as well as a video analysis showing that the player is running slower than the player typically runs. The user device 420 may be configured to display one or more conditions of the player and a recommendation for when to provide the player with a break. In some embodiments, the user device 420 may provide an interactive user interface that may allow a user (e.g., a coach) to execute break recommendations by interacting with a game server. For example, a user device may display a break recommendation to give a specified player a break in 3 minutes, as well as user inputs (e.g., buttons) that allow the user to indicate agreement or disagreement with the suggestion. In response to receiving a user input indicating agreement, the user device 420 may send in instruction to a game server to cause the player to be given a break at the recommended time. For example, in some embodiments, the instruction may instruct the game server to call a timeout or to initiate a substitution of the player. In some embodiments, the user device 420 may include a selectable functionality that when selected, causes the break recommendations or some classes of break recommendations to execute automatically. For example, a coach may want all break recommendations that indicate a player is in danger of being injured or suffering a serious medical problem to execute automatically by the system (i.e., to automatically call for a player substitution, timeout, or the like), whereas the coach may want to manually approve recommendations that merely indicate the player is not performing at an optimal level.

In some embodiments, digital camera(s) 430 can include any type of image capture device that is capable of obtaining images and/or video of one or more players of a sport, a game, a match or any other such competitive physical endeavor. According to some embodiments, one or more digital camera(s) 430 may be disposed in a sports arena such that they have a field of view of players of a sport. According to some embodiments, digital camera(s) 430 may include a processor 432 that may allow processing of the digital images. For example, according to some embodiments, digital camera(s) may include image recognition software that may allow the digital camera to visually identify one or more players that are being recorded by the digital camera(s) 430. Further, digital camera(s) 430 can include a transceiver 434 or other wired or wireless communications interface for transmitting images and/or video to the break prediction server 410 and/or a user device(s) 420. According to some embodiments, digital camera(s) 430 may also include one or more long-range microphones for obtaining sound recordings from one or more players of the sport. According to some embodiments, video and/or sound may also be obtained from one or more user device(s) 420 and provided to break prediction server 410 for analysis. For example, in some embodiments, one or more fans in the audience may be video recording a game on their mobile phone and the break prediction server 410 may be configured to obtain or otherwise receive these recordings for incorporation into determining a player condition.

In some embodiments, a biometric sensor(s) 440 can include one or more sensors that are disposed on or about a player's body. Biometric sensor(s) 440 can be configured to obtain, for example but not limited to, a player's heartrate, blood pressure, respiration rate, temperature, hydration level, pain sensation, chemical levels (e.g., adrenalin level), perspiration rate, muscular tension, pupil dilation or any other such biometric signal that sensors may be capable of obtaining. In some embodiments, biometric sensor(s) 440 may also include sensors that are configured to measure speed, force, acceleration and other such physics-based quantities that may represent a movement of or impact on a player's body or apparel (e.g., sensors to measure the impact made to a helmet or pad worn by the player). Biometric sensor(s) include a processor 442 for processing the biometric data obtained from the sensors and a transceiver 444 for transmitting the biometric data to the break prediction server 410. According to some embodiments, the biometric sensor(s) 440 can be configured to continuously transmit biometric data to break prediction server 410. In some embodiments, biometric sensor(s) can be configured to transmit biometric data to break prediction server 410 intermittently or in response to a request from break prediction server 410. According to some embodiments, each player of a sport or game can be fitted with their own set of biometric sensor(s), such that biometric signals transmitted to break prediction server 410 may be clearly associated with each respective player. In this way, break prediction server 410 can receive biometric data associated with each player that may be used in assessing the condition of each player.

Figure 5:
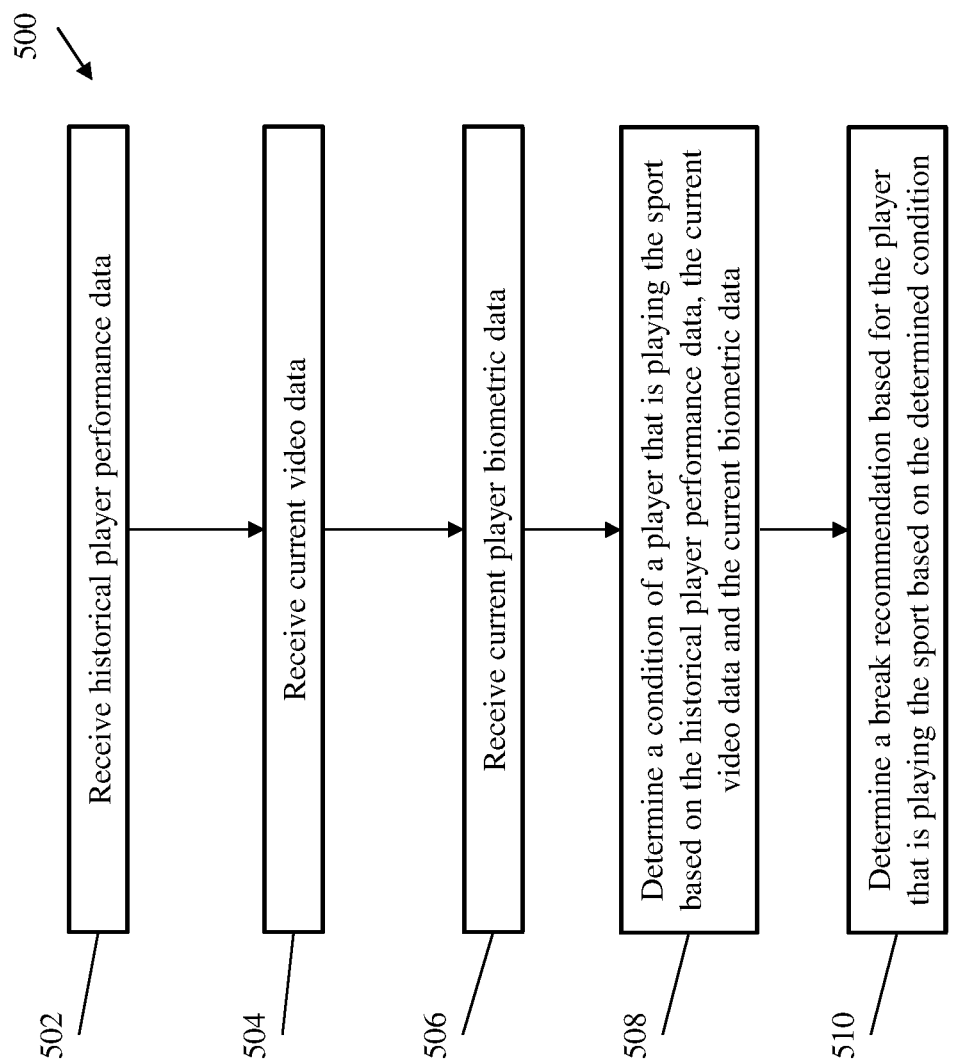
FIG. 5 depicts a flow diagram of a method for providing observation-based recommendations for improved player performance and safety according to one or more embodiments of the invention.

FIG. 5 depicts a flow diagram of a method for providing observation-based recommendations for improved player performance and safety according to one or more embodiments of the invention. In one or more embodiments of the present invention, the method 500 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 500 begins at block 502 and includes receiving (e.g., by break prediction server 410) historical player performance data. According to some embodiments, the historical player performance data can include known correlations between visual characteristics, biometric characteristics and condition of players of one or more sports. In some embodiments, the historical player performance data can include past video data and past biometric data associated with one or more players of the sport. According to some embodiments, the known correlations between visual characteristics, biometric characteristics and condition of players of one or more sports can be derived using machine learning techniques. For example, machine learning models can be used to create a baseline performance level for a player or a position and can be used to compare a player's current performance against the baseline performance level to detect deviations.

Next, as shown in block 504, the method 500 includes receiving (e.g., by break prediction server 410) current video data. According to some embodiments, the current video data can include video, one or more images and/or audio recordings of one or more players that are playing a sport. It should be understood that although the disclosure generally refers to embodiments involving players playing a sport, the embodiments of the disclosure could be applied to any situation where people are exerting physical effort, such as games, competitions, races, and manual or physical labor. According to some embodiments, the current video data can be received from one or more video cameras (e.g., digital camera(s) 430) disposed about, for example, a stadium or arena in which the sport is being played.

Next, as shown in block 506, the method 500 includes receiving (e.g., by break prediction server 410) current player biometric data. According to some embodiments, current player biometric data can include biometric data of the one or more players that are playing the sport. According to some embodiments, the current player biometric data can be received from one or more biometric sensors disposed about the player that is playing the sport. The biometric sensors (e.g., biometric sensor(s) 440) can be configured to obtain biometric readings from the player that is playing the sport.

Next, as shown in block 508, the method 500 includes determining (e.g., by break prediction server 410) a condition of a player that is playing the sport. In some embodiments, the condition of the player can be determined based on the historical player performance data, the current video data, and the current biometric data. For example, in some embodiments, by comparing player movements detected in the video data and the associated player biometric data with the historical player performance data, the system can generate predictions of current and/or future conditions of the player. According to some embodiments, biometric signals may be compared to historical or baseline levels. For example, the system may establish a baseline heartrate of a player (or of a typical player) that represents the player's typical heartrate in relation to the player's activities (e.g., heartrate when running, heartrate when walking, heartrate when resting after running, etc.) and may compare the player's current heartrate to the baseline to determine whether the current heartrate represents an abnormality or deviation from the expected heartrate. Other biometric signals may be similarly compared to respective baselines to identify any irregularities that may be indicative of a potential issue. In some embodiments, multivariate comparisons of a set of biometric signals against a corresponding set of baselines for the biometric signals may be performed to identify clustering of abnormal signals. For example, if a set of ten different biometric signals are simultaneously tracked and compared to baseline biometric signals, and only one of the ten is showing an abnormal reading, the system may not take any action, but if some threshold number (e.g., more than three) of signals are abnormal, the system may recommend an action, such as taking a break. According to some embodiments, predicted current and/or future conditions of a player may be determined using machine learning techniques. In some embodiments, predicted current and/or future conditions may be represented as one or more probability distributions and/or confidence levels that the player has (or will have at one or more specified time(s) in the future) a particular condition.

According to some embodiments, the condition of the player that is playing the sport can include one or more of an injury condition, a focus condition, a performance condition and/or a recover condition. An injury condition can include an indication of a degree to which the player that is playing the sport has an injury and/or is likely to become injured. A focus condition can include an indication of a degree to which the player that is playing the sport is likely to make one or more mistakes. A performance condition can include an indication of a degree to which the player that is playing the sport is performing relative to a known average performance. A recovery condition can include an indication of a degree to which a break of a specified duration from playing the sport given to the player that is playing the sport would improve one or more of the injury condition, the focus condition or the performance condition of the player that is playing the sport.

In some embodiments, determining a condition of a player that is playing the sport can include analyzing the current video data to determine visual characteristics of the player that is playing the sport, analyzing the current biometric data to determine biometric characteristics of the player that is playing the sport, and determining one or more conditions of the player that is playing the sport based on the determined visual characteristics of the player of the sport, the determined biometric characteristics of the player that is playing the sport, and the known correlations of the historical player performance data. According to some embodiments, the visual characteristics of the player that is playing the sport can include one or more of a potential injury, a mistake, a lack of focus, a reaction time, a speed, a balance problem, and a vision problem. According to some embodiments, determining visual characteristics of a player can include identifying one or more player movements, such as limping, stumbling, loss of balance, slowed reaction time, grabbing or gripping a body part in apparent pain, and the like, which can be correlated with and/or indicative of a one or more conditions. As will be appreciated by those of skill in the art, image recognition techniques and/or machine learning techniques can be applied to videos to identify such player movements. For example, machine learning models can be trained to recognize occurrences that may be representative of a reduction in performance such as dropping a ball, stumbling, falling, committing fouls, missing a throw, missing a kick, etc.). In some embodiments, the system may present image frames or video segments to for example, a coach, for manual analysis and classification (e.g., when viewing a play, a coach may indicate that a particular player failed to properly read the opposing team's defensive or offensive layout). In some embodiments, the biometric characteristics of the player that is playing the sport can include, but are not limited to, one or more of a heart rate, a breathing rate, a blood pressure, a chemical level (e.g., an adrenaline level), a pain sensation, a stress response, a health condition, and a level of tiredness.

Next, as shown in block 510, the method 500 includes determining (e.g., by break prediction server 410) a break recommendation for the player that is playing the sport. According to some embodiments, the break conditions can be based on the condition determined in block 508. In some embodiments, the break recommendation can include an indication of suggested timing for the player that is playing the sport to take a break from playing the sport or any other such type of recommendation as previously described above. According to some embodiments, the break recommendation may be determined based on one or more performance thresholds or player safety risk tolerances that are input by a user of the system. For example, if a user specifies a very low player safety risk tolerance, the system will generally have a higher likelihood of recommending that a player rest (or recommend that the player rest sooner) given the same set of biometric and video data.

According to some embodiments, the method 500 may further include outputting the break recommendation to a user device (e.g., user device 420) associated with a coach of the player that is playing the sport. In some embodiments, the break recommendation may be output to a user device associated with a referee, league official, or to the player themselves. For example, in some embodiments, a player may wear a helmet or augmented reality glasses that may include a heads-up display of the player's predicted condition and recommended break time.

In some embodiments, the method 500 may further include automatically transmitting a break instruction to a game server. In some embodiments, the break instruction can represent an instruction to bring the player that is playing the sport out of a game in accordance with the break recommendation. In some embodiments, in response to determining that the condition of the player that is playing the sport is dangerous, the method may further include determining the break recommendation includes recommending that the player that is playing the sport be given a break immediately.

Figure 6:
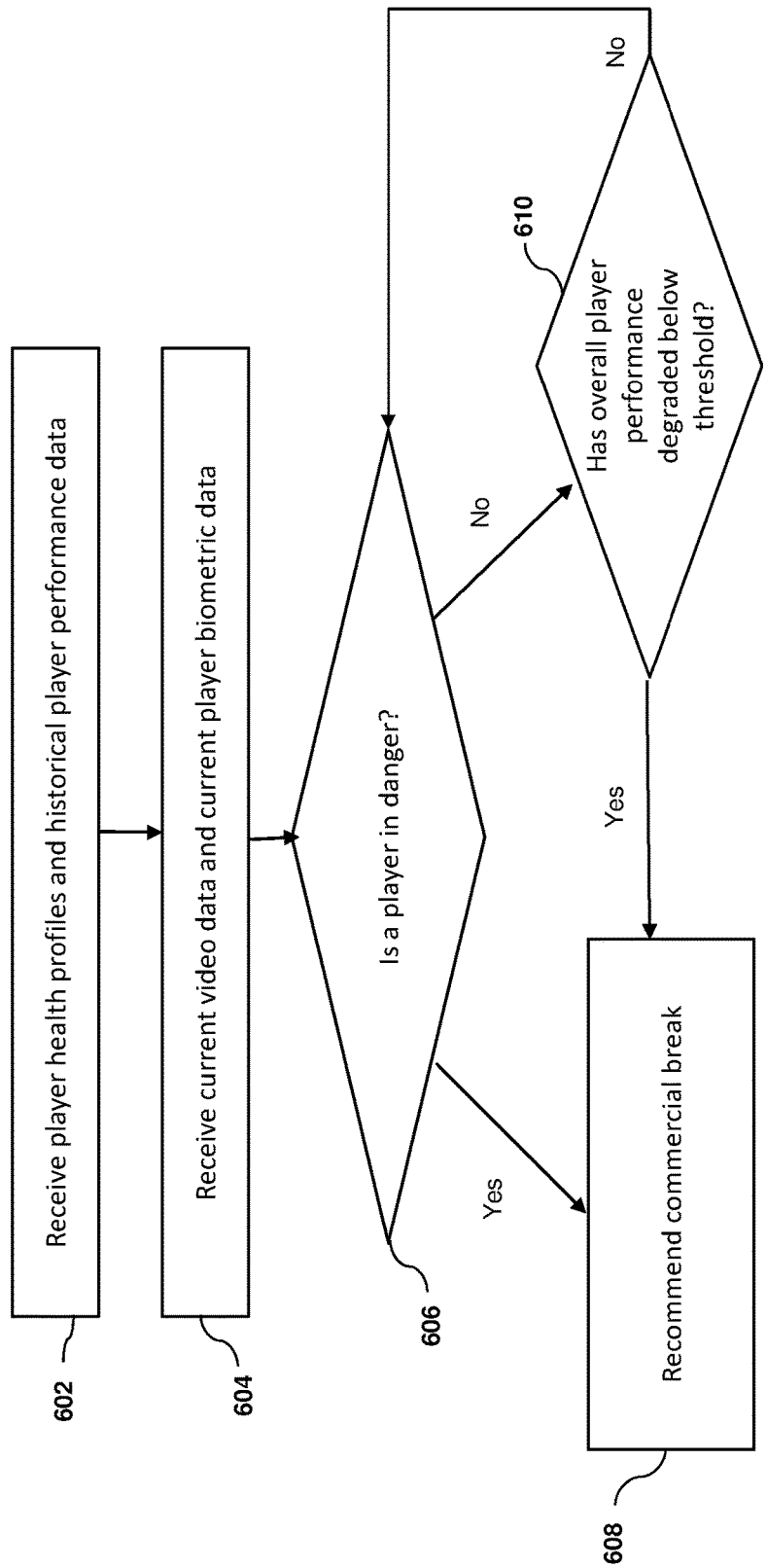
FIG. 6 depicts a flow diagram of a method for providing observation-based recommendations for a player safety-based commercial break according to one or more embodiments of the invention.

Turning now to FIG. 6, a flow diagram of a method 600 for providing observation-based recommendations for a player safety-based commercial break in accordance with an embodiment is shown. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 600 begins at block 602 and includes receiving (e.g., by break prediction server 410) player health profiles and historical player performance data in a manner similar to that described above with respect to block 502. Player health profiles may include previous performance and injury data for each player, as well as a listing of health conditions and associated vital signs to monitor for. For example, a player with a heart condition may have lower biometric thresholds to trigger a break recommendation than players without heart conditions.

Next, as shown at block 604, the method includes receiving (e.g., by break prediction server 410) current video data and current player biometric data in a manner similar to that described above with respect to blocks 504 and 506.

Next, as shown at block 606, the method includes determining (e.g., by break prediction server 410) whether any of the players that are playing the sport are classified as being in danger. According to some embodiments, being classified as being in danger may mean that a player is considered to have above a threshold probability of having or being predicted to have in the near future, a condition that places the player in danger of coming to harm or injury. For example, if the player's heart rate is elevated above safe levels and/or the visual analysis is detecting player movements that are cause for concern, the system may determine that the player is in danger or is predicted to be in danger soon. If the system determines a player is in danger, the method proceeds to block 608, where the system generates and outputs a recommend for a game break, such as a commercial break in a game that is televised. If the system does not determine that any player is in danger, then the method proceeds to block 610.

Next, as shown at block 610, the method includes determining (e.g., by break prediction server 410) whether overall player performance has degraded below a predetermined threshold. In some embodiments, the system may determine a performance condition of each player and compare it to each player's respective average performance. For example, the system may determine that a first player is performing at 80% of their normal performance level, a second player is performing at 90% of their normal performance level, and a third player is performing at 110% of their normal performance level. Based on these determinations, the system can determine the average performance of all players and compare the average performance to a predetermined threshold.

If the system determines that the overall player performance has degraded below the predetermined threshold, then the method continues to block 608, where the system generates and outputs a recommend for a commercial break. If the system determines that the overall player performance has not degraded below the predetermined threshold, then the method loops back to block 606 where the system again determines whether any one player is in danger. In this way, the system can be used to maintain a minimum overall performance level of a game or a match. While maintaining player safety, this may also be useful in ensuring that a game remains competitive and/or entertaining by providing breaks where appropriate to maintain a predetermined level of overall player performance. According to some embodiments, the system may automatically determine and initiate breaks in the game, for example, by interacting with a game server or presenting an automated message to a referee to take a timeout. In some embodiments, the break prediction server 410 may be in communication with an advertising server that and may automatically initiate one or more advertisements (e.g., television, electronic billboard, smartphone, radio, internet, or augmented reality advertisements) or other displays in conjunction with the automatically initiated game breaks.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving historical player performance data, the historical player performance data comprising visual characteristics, biometric characteristics and conditions of players of sports;
   receiving current video data, the current video data comprising images of a plurality of players that are playing a sport;
   receiving current player biometric data, the current player biometric data comprising biometric data of the plurality of players that are playing the sport;
   based on the historical player performance data, the current video data and the current player biometric data, determining a condition of a target player, the target player being a player of the plurality of players that are playing the sport;
   determining, based on the determined condition, a break recommendation for the target player, wherein the break recommendation includes a predicted time at which to give the target player a break, and a duration of the break;
   outputting the break recommendation to a user device;
   receiving a user-input that is indicative of agreement with the break recommendation; and
   in response to the user-input, sending an instruction to a game server to pause the sport to commence the break for the target player, wherein the instruction to the game server causes the game server to initiate a televised commercial break.

2. The computer-implemented method of claim 1, wherein the condition of the target player comprises one or more of:
   an injury condition comprising an indication of a degree to which the target player has an injury and/or is likely to become injured;
   a focus condition comprising an indication of a degree to which the target player is likely to make one or more mistakes;
   a performance condition comprising an indication of a degree to which the target player is performing relative to a known average performance; and/or
   a recovery condition comprising an indication of a degree to which a break of a specified duration from playing the sport given to the target player would improve one or more of the injury condition, the focus condition or the performance condition of the player that is playing the sport.

3. The computer-implemented method of claim 2, wherein responsive to determining that the condition of the target player is dangerous, determining the break recommendation comprises recommending that the target player be given a break immediately.

4. The system of claim 3, wherein the break recommendation further includes identification of another player to substitute the target player.

5. The computer-implemented method of claim 1, wherein the historical player performance data comprises past video data and past biometric data associated with one or more players of the sport.

6. The computer-implemented method of claim 1, wherein determining a condition of a target player comprises:
   analyzing the current video data to determine visual characteristics of the target player, the visual characteristics comprising at least one or more of a potential injury, a mistake, a lack of focus, a reaction time, a speed, a balance problem, and a vision problem;
   analyzing the current player biometric data to determine biometric characteristics of the target player, the biometric characteristics comprising at least one of more of a heartrate, a breathing rate, a pain sensation, a stress response, a health condition, and a level of tiredness; and
   determining one or more conditions of the target player based on the determined visual characteristics of the target player, the determined biometric characteristics of the target player, and the known correlations of the historical player performance data.

7. The computer-implemented method of claim 1, wherein the known correlations between visual characteristics, biometric characteristics and condition of players of sports are derived using machine learning techniques.

8. The computer-implemented method of claim 1, wherein the current player biometric data is received from one or more biometric sensors disposed about the target player and that are configured to obtain biometric readings from the target player.

9. The method of claim 1, wherein the break recommendation further includes identification of another player to substitute the target player.

10. A system comprising:
a processor communicatively coupled to a memory, the processor configured to:
receive historical player performance data, the historical player performance data comprising visual characteristics, biometric characteristics and conditions of players of sports;
receive current video data, the current video data comprising images of a plurality of players that are playing a sport;
receive current player biometric data, the current player biometric data comprising biometric data of the plurality of players that are playing the sport;
based on the historical player performance data, the current video data and the current player biometric data, determine a condition of a target player, the target player being a player of the plurality of players that are playing the sport;
determine, based on the determined condition, a break recommendation for the target player, wherein the break recommendation includes a predicted time at which to give the target player a break, and a duration of the break;
output the break recommendation to a user device;
receive a user-input that is indicative of agreement with the break recommendation; and
in response to the user-input, send an instruction to a game server to pause the sport to commence the break for the target player, wherein the instruction to the game server causes the game server to initiate a televised commercial break.

11. The system of claim 10, wherein the condition of the target player comprises one or more of:
an injury condition comprising an indication of a degree to which the target player has an injury and/or is likely to become injured;
a focus condition comprising an indication of a degree to which the target player is likely to make one or more mistakes;
a performance condition comprising an indication of a degree to which the target player is performing relative to a known average performance; and/or
a recovery condition comprising an indication of a degree to which a break of a specified duration from playing the sport given to the target player would improve one or more of an injury condition, a focus condition or a performance condition of the target player.

12. The system of claim 10, wherein responsive to determining that the condition of the target player is dangerous, determining the break recommendation comprises recommending that the target player be given a break immediately.

13. A computer program product comprising a computer readable storage medium having program instructions embodied therewith the program instructions executable by a computer processor to cause the computer processor to perform a method comprising:
receiving historical player performance data, the historical player performance data comprising visual characteristics, biometric characteristics and conditions of players of sports;
receiving current video data, the current video data comprising images of a plurality of players that are playing a sport;
receiving current player biometric data, the current player biometric data comprising biometric data of the plurality of players that are playing the sport;
based on the historical player performance data, the current video data and the current player biometric data, determining a condition of a target player, the target player being a player of the plurality of players that are playing the sport;
determining, based on the determined condition, a break recommendation for the target player, wherein the break recommendation includes a predicted time at which to give the target player a break, and a duration of the break;
outputting the break recommendation to a user device;
receiving a user-input that is indicative of agreement with the break recommendation; and
in response to the user-input, sending an instruction to a game server to pause the sport to commence the break for the target player, wherein the instruction to the game server causes the game server to initiate a televised commercial break.

14. The computer program product of claim 13, wherein the break recommendation further includes identification of another player to substitute the target player.

* * * * *